Inventor
Honoriu Dan Teodorescu by Karl F. Ross
Attorney

Inventor
Honoriu Dan Teodorescu by Karl F. Ross
Attorney

Inventor
Honoriu Dan Teodorescu
by
Karl F. Ross
Attorney

United States Patent Office 3,486,078
Patented Dec. 23, 1969

3,486,078

CONVERTER AMPLIFIER

Honoriu Dan Teodorescu, Timisoara, Rumania, assignor to Ministerul Industriei Constructülor de Masini, Bucharest, Rumania Filed Nov. 30, 1966, Ser. No. 598,047
Claims priority, application Rumania, Dec. 4, 1965, 50,633; Mar. 31, 1966, 51,217
Int. Cl. H01h *47/00, 47/24*
U.S. Cl. 317—123 8 Claims

ABSTRACT OF THE DISCLOSURE

An electromechanical amplifier converter in which two U-shaped cores together or with a movable armature when both cores are fixed, define a pair of airgaps in a common magnetic circuit. The poles of the cores are shunted partially by magnetically saturable bridge pieces and operating coils are provided on the cores and are connected to an alternating current source via rectifier diodes. Control coils energizable via a direct current source control saturation of the bridge pieces and the mechanical operation of the converter whose movable core or armature is connected to a load.

My present invention relates to relay amplifiers and contactor amplifiers with two stages of amplification, to electropneumatic or electrohydraulic converters with additional amplification, and to control electromagnets with internal amplification.

Various types of electromechanic converters convert an electrical input into a mechanical action and are used for the displacement of some moving parts (armatures) so as to establish contacts in relays, contactors, switches etc., or to effect some mechanical action (for example the act of selection in automatic grading devices).

The type of electromechanical converter most frequently used with relays and switches, grading flaps of automatic grading devices and the like, is the type using electromagnets. These have simple and reliable parts justifying thus their widespread use.

However, converters with electromagnets and moving armatures with linear or circular displacement also have a number of shortcomings including the fact that core magnetization, i.e., the displacement of the moving armature, requires high control power so that control circuits of converters must be either complicated (by the inclusion of amplifiers) or will offer less operating reliability (if additional elements with moving contacts are included).

It is, therefore, the principal object of the present invention to provide an electromechanical converter which will obviate these drawbacks and provide greater reliability using smaller control power than has been the case heretofore.

According to the present invention, an electromechanical converter is provided which has at least two magnetically permeable members (i.e., two U-shaped cores whose poles are formed by the shanks of the U and, if desired, a magnetically permeable armature when the movement of the latter toward the cores is preferred in place of relative movement of the cores) defining at least three magnetic circuits. One of these circuits is common to all of the magnetically permeable members while the other two circuits are those of the U-shaped cores, the common magnetic circuit having at least two airgaps. Respective electromagnetic coils (operating or main coils or windings) on these cores are connected in circuit to an alternating source through rectifier means to generate a flux of variable magnitude in the magnetic circuits which closes partly through the common magnetic circuit and partly through the circuits of the cores via magnetically saturable bridge pieces which shunt the poles of the cores. Control means, including control coils adapted to vary the flux in the circuits, is designed to shift the flux intensity between a relatively low value (below the saturation level of the bridge pieces) and a relatively high value (exceeding the saturation level of the bridge pieces).

The converter amplifier can be built with two amplifying elements (cores) with autosaturation able to displace a moving armature by operating upon both its ends in the same direction.

The converter amplifier according to the invention can also be built without a moving armature, in which case the moving part consists of one of the two elements or cores of the magnetic amplifier while the other element forms the fixed part, both cores having their sides with the respective magnetic bridges facing one another. The load coils, control coils and diodes (rectifier means) are connected in such manner as to allow the flux of respective half cycles of the alternating current through the control coils of the cores and the direct component of the flux of both elements to pass in the same direction in the common magnetic circuit, adding together and operating jointly with the second harmonic of the flux to attract strongly the movable element. The second harmonic of the flux appears in the very highly saturated magnetic bridges at the time when the current passing through the load coils has its maximum value. When one inverts the connection of the load coil and the control coil of one of the elements (alternating current flowing also through load coils), the direct components of the fluxes of both elements are subtracted, the second harmonic is reduced and the elements are drawn together with much smaller force.

In the connection, according to the invention, where direct components and the component formed by the second harmonic of the flow add to a current sent by the control in the direction required for closing the coverter (attracting the elements), the current passing through the load coils increases strongly only up to the point of closing, falling then to a much lower value. This permits reduction of the amount of copper used for control coils, since in a steady-state condition, smaller currents flow through the coils than in the transient condition.

According to the invention, the reducing of the effective section of the magnetic circuit is obtained by closing the sheets of each element in the part towards the airgap with sheets placed at every third sheet of the laminated core so that the flux from three core sheets should be connected or shunted with a single bridge (sheet), or at every second sheet so that the flux of two core sheets should be connected with a single bridge; these cases are not to be considered as restrictive, since, according to the invention, the section can be reduced by using sheets placed at every fourth sheet, at every fifth sheet, etc., or by combining this effect with the simultaneous change of bridge sheet dimensions as related to dimensions of sheets in the remaining magnetic circuit.

The invention is described below, with reference to the drawing in which.

Figure 1:
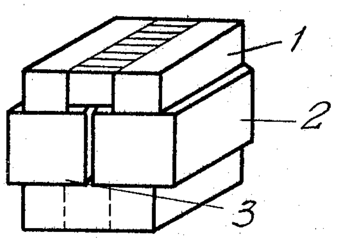
FIG. 1 is a perspective view of the amplifier element of a converter amplifier according to the invention.
Figure 1A:
FIG. 1A is a detail sectional view thereof.
Figure 2A:
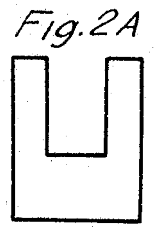
FIGS. 2A, 2B and 2C show the sheets of this amplifier.
Figure 2B:
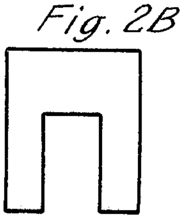
Figure 2C:
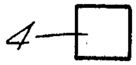

Thus, FIG. 1 shows core 1 of a converter according to the invention, with coils 2 and 3 (each consisting of one working coil and one control coil), and with the yoke with magnetic bridges at the top part as shown also by the detail of FIG. 1A. It will be noted that every second sheet of the laminated core is omitted. FIGS. 2A, 2B and 2C show U and I section sheets which form the core, I section sheets 4 for closing or shunting the magnetic poles, being placed only on the bottom yoke and missing at the top one, for the reasons mentioned above.

Figure 3:
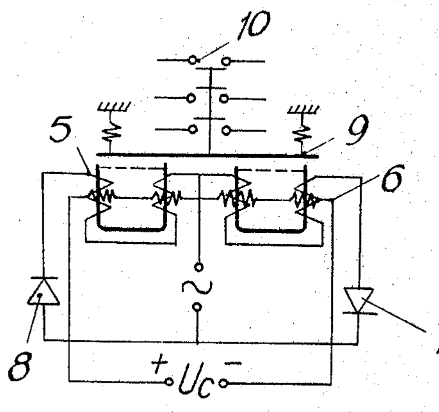
FIG. 3 is a circuit diagram of a converter amplifier with moving armature (relay or contactor)
Figure 4:
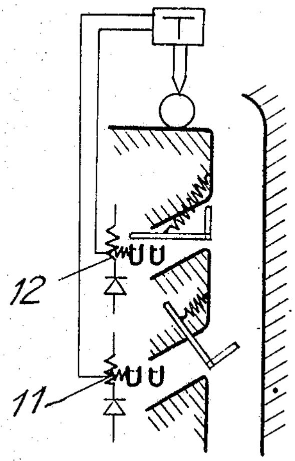
FIG. 4 is a diagram of an automatic dimensional grading device with converter amplifier according to the invention.

FIG. 3 shows the typical connection of a converter according to the invention used as a high-power relay or a switch. The control-voltage source is seen at $U_c$. The working or operating coils 5 are connected in series with diodes 7 and 8, across the A.C. source, while the control coils 6, the armature 9 and the actuated contacts 10 are provided as illustrated. FIG. 4 shows an automatic dimensional grading device where converters 11 and 12 operate the grading flaps in accordance with the size as measured by transducer T.

Figure 5:
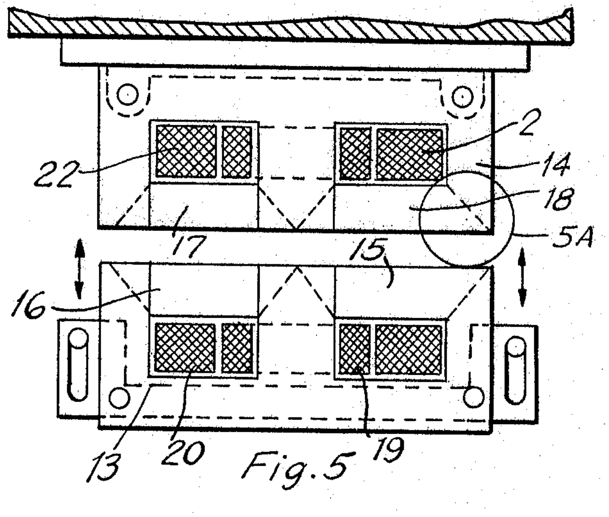
FIG. 5 is a converter amplifier without a moving armature, shown in cross section.
Figure 5A:
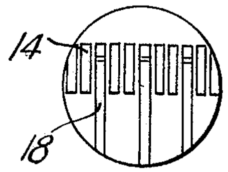
FIG. 5A is a detail view of region VA of FIG. 5.

FIG. 5 shows the two elements of the converter amplifier without a separate moving armature; in this system moving element or core 13 mechanically operates the load when it moves relative to the fixed core or element 14. Magnetic bridges are noted with 15, 16 for the moving element and with 17, 18 for the solid element. The detail view of FIG. 5A shows that bridges 18 are arranged in such manner that fluxes coming from three sheets of core 14 are closed with a single bridge. Control and load coils of the elements, connected according to the diagram of a magnetic amplifier with feedback, are noted by 19, 20, 21 and 22.

Figures 6, 9, 10:
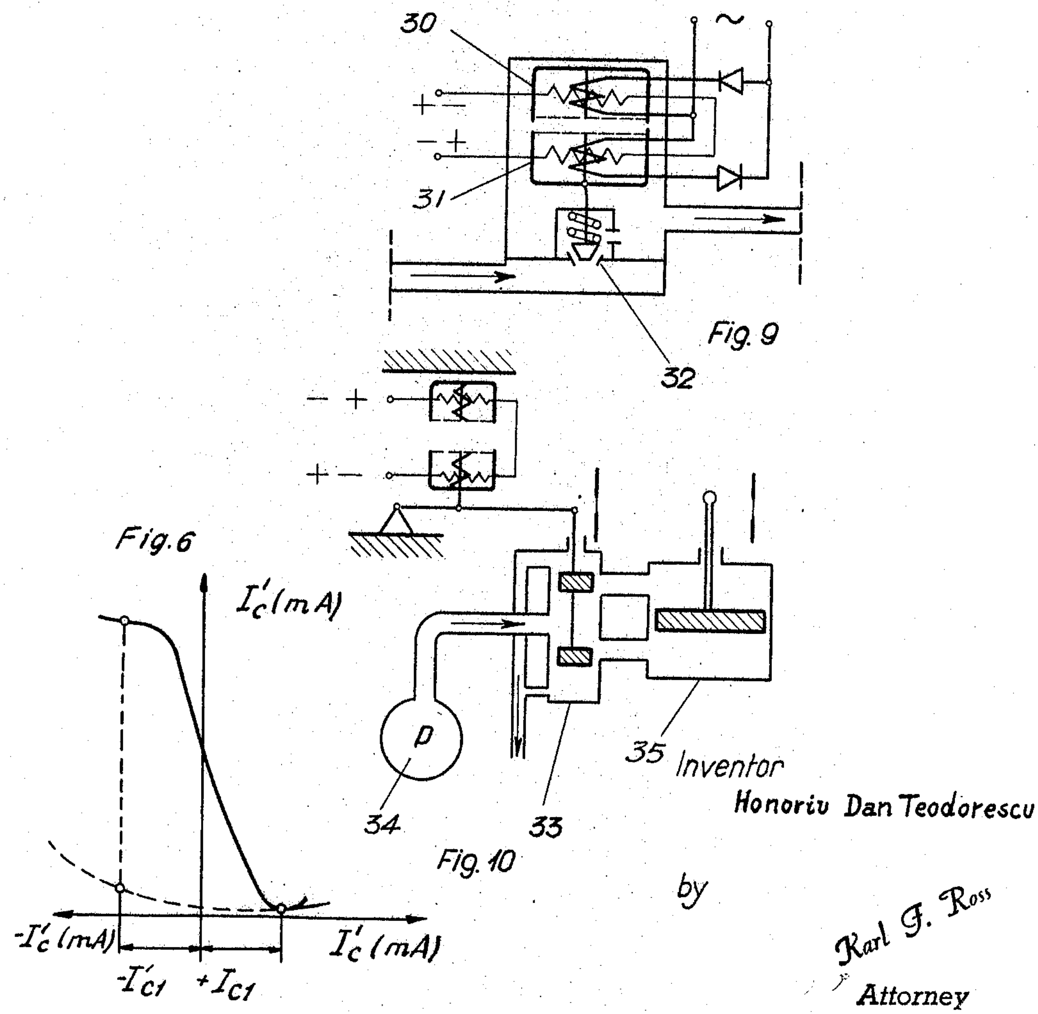
FIG. 6 is a graph of the load current-control current characteristics of a converter as seen in FIG. 5, the open condition being shown in solid line and the closed condition in broken line.
FIG. 9 is a diagram of an electropneumatic converter with additional amplification.
FIG. 10 is a diagram of an electrohydraulic converter with additional amplification.

Control and load coils are connected with diodes in such manner (the sense of the coils as against the cores being so selected) that at the magnetic coupling of the cores, the direct components of the fluxes of the two elements should add and the second harmonic appearing in the bridges should also add. FIG. 6 shows characteristics of the current flowing through load coils $I_c$ function of the control current $I_c'$, when converter elements are separated (solid line) and after they attract (broken line). It can be seen that at the same control current $(-I_{c1}')$ current $Ic$ is higher before coupling occurs and very low after elements are attracted (i.e., in steady-state condition). Current $Ic$ is also brought down to a control signal corresponding to the open position $(-I_{c1}')$.

Figure 7:
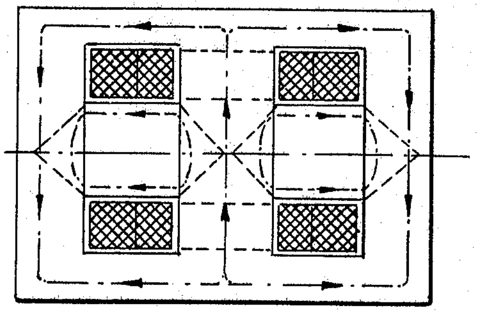
FIG. 7 is a view of the converter of FIG. 5 in its closed position.

FIG. 7 shows the connected position of converter elements, featuring the closing of the direct component (dot-dash line) and the closing of the 100 Hz. or 120 Hz. component of 60 Hz. supply of the converter (dash and two dots).

Figure 8:
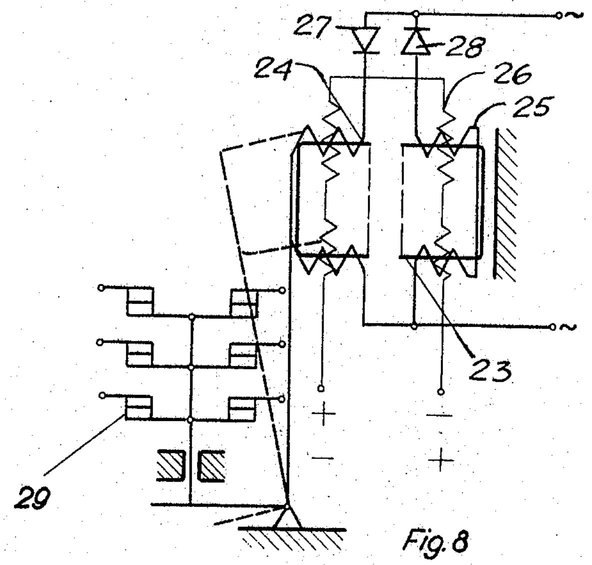
FIG. 8 is a diagram of a three-phase switch with converter amplifier without armature.
Figures 11, 12:
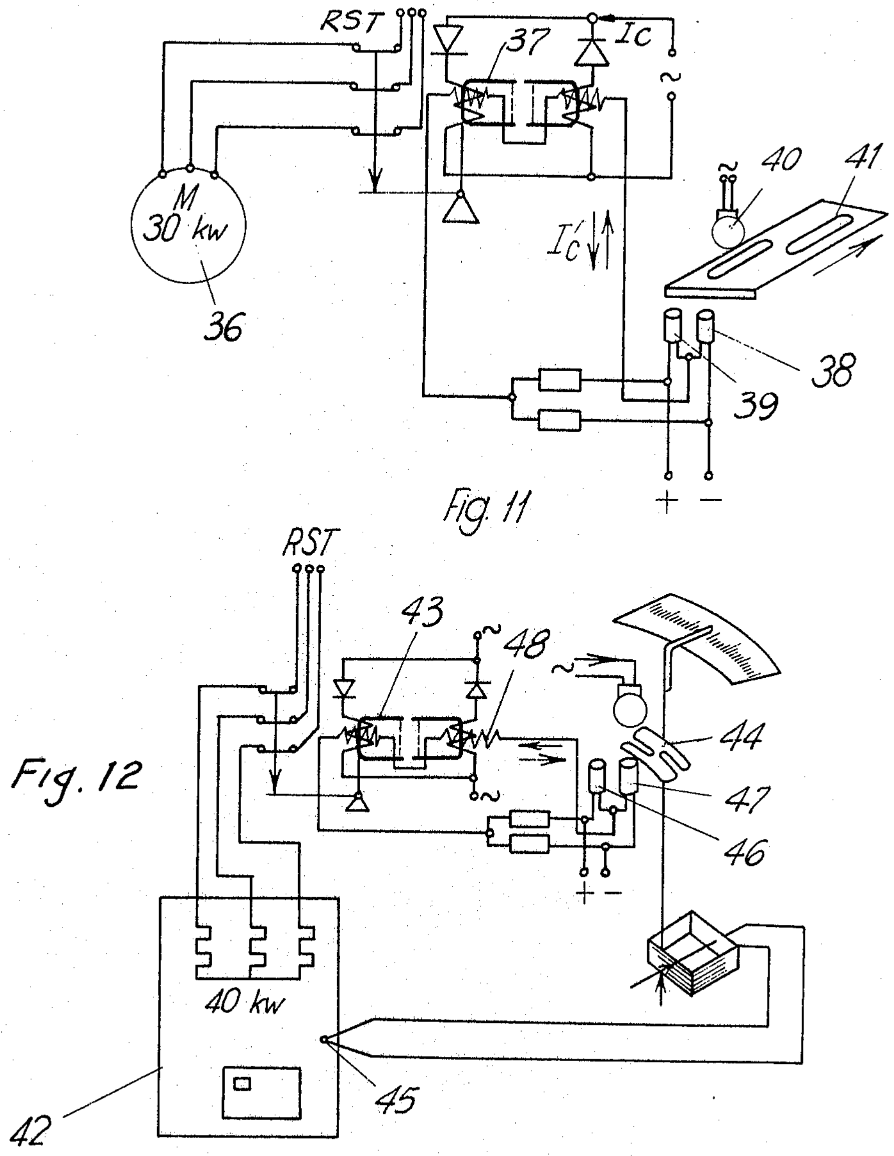
FIG. 11 is a control diagram of the operation of an asynchronous motor by programming transducers through a switch with a converter amplifier according to the invention.
FIG. 12 is a diagram of an automatic temperature control system of a furnace using a switch with the improved converter amplifier.

In FIG. 8 which shows the diagram of a three-phase switch (contactor) actuated by a converter amplifier without armature, converter cores 23, 24 have load and control coils 25, 26, the former being in series with diodes 27, 28; the switch contacts are shown at 29. In FIG. 9, the electropneumatic converter has cores 30, 31 and upon receiving a very small control signal, actuates valve 32 allowing thus the passage of pressurized air in the direction of the arrows. For an electrohydraulic converter as seen in FIG. 10, the movable core is connected with valve 33; the pump 34 feeds the valve which, in turn, controls the hydraulic engine 35. FIG. 11 shows an asynchronous motor 36, converter amplifier 37 directly controlled from photodiodes 38, 39, Wheatstone-bridge-connected and illuminated by light source 40 through program holder 41. FIG. 12 shows the temperature control system of a furnace 42 (used for heat treatment or drying) heated by means of resistance elements, connected to the system through converter 43 according to the invention, following the deviation rate transformed in a light signal by diaphragm 44 of the indicating instrument connected to thermocouple 45. The diagram uses photodiodes 46, 47 bridge connected, for control operations. Control windings 48 of the converter are connected to the bridge bias.

I claim:

1. An electromechanical amplifier-converter comprising:

at least two magnetically permeable members, comprising at least two relatively movable members, defining between them at least three closable magnetic circuits including a common magnetic circuit through all of said members and formed with at least two airgaps, two of said members being formed each as a respective electromagnetic core with a pair of core poles constituting one side of the said airgaps;

respective electromagnetic operating coils on said cores;

magnetically saturable bridge pieces spanning the poles of each core for forming a magnetic shunt thereacross;

circuit means connected with said operating coils for energizing same with an operating current generating in said cores a flux of variable magnitude closing partially through said bridge pieces and partially through the common magnetic circuit;

control means for modulating the amplitude of said flux and including a control coil effective to reinforce the magnetic intensity in at least one of said magnetic circuits to vary the magnitude of said flux between a relatively low value below the saturation level of said bridge pieces and a relatively high value exceeding the saturation level of said bridge pieces; and means connecting a movable one of said members to a load for displacement thereof upon attraction of the relatively movable members toward one another.

2. The converter defined in claim 1 wherein said bridge pieces across each pair of said poles have a total cross section traversed by magnetic flux smaller than the cross section of the respective core.

3. The converter defined in claim 2 wherein each of said cores is composed of a stack of magnetically permeable sheets and said bridge pieces are magnetically permeable sheet members of a number less than the number of sheets in each core.

4. The converter defined in claim 1 wherin said circuit means includes a source of alternating current connected across said electromagnetic operating coils, and rectifier means in series between said source and said operating coils for passing alternate half cycles of an alternating current through the operating coils of said cores respectively, said control means including at least two control coils respectively wound on said core and connected in series, and a source of direct current connected to said control coils and of a power substantially less than that produced by said source of alternating current in said electromagnetic operating coils.

5. The converter defined in claim 4 wherein said electromagnetic operating coils and said control coils are so wound about the respective cores that said flux has a continuous component which is additive in the common magnetic circuit.

6. The converter defined in claim 4 wherein said control coils are connected in the diagonal of a Wheatstone bridge, having, in sides of the bridge adjoining said diagonal, a pair of transducers capable of unbalancing said bridge.

7. The converter defined in claim 1 wherein one of said relatively movable members is an armature which is juxtaposed with said cores and simultaneously attracted to them.

8. The converter defined in claim 1 wherein one of the relatively movable members is one of said cores and is mounted for movement toward the other of said cores.

References Cited

UNITED STATES PATENTS

| | | | |
|---|---|---|---|
| 2,413,076 | 12/1946 | Schick | 317—124 |
| 2,587,983 | 3/1952 | Durand | 335—237 X |
| 2,588,522 | 3/1952 | Harris | 317—123 |
| 3,001,115 | 9/1961 | Gendreu et al. | 317—155.5 |
| 3,113,251 | 12/1963 | Moser et al. | 335—236 |

JOHN F. COUCH, Primary Examiner

W. H. BEHA, Jr., Assistant Examiner

U.S. Cl. X.R.

317—124, 155.5; 335—227